United States Patent
Sakai

(10) Patent No.: US 9,849,514 B2
(45) Date of Patent: Dec. 26, 2017

(54) CUTTING INSERT AND CUTTING TOOL, AND METHOD FOR PRODUCING CUT WORKPIECES USING CUTTING TOOL

(71) Applicant: KYOCERA Corporation, Kyoto-shi, Kyoto (JP)

(72) Inventor: Kouhei Sakai, Moriyama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/891,575

(22) PCT Filed: May 28, 2014

(86) PCT No.: PCT/JP2014/064086
§ 371 (c)(1),
(2) Date: Nov. 16, 2015

(87) PCT Pub. No.: WO2014/192798
PCT Pub. Date: Dec. 4, 2014

(65) Prior Publication Data
US 2016/0082518 A1    Mar. 24, 2016

(30) Foreign Application Priority Data

May 28, 2013 (JP) .................................. 2013-111447

(51) Int. Cl.
*B23B 27/14* (2006.01)
(52) U.S. Cl.
CPC .... *B23B 27/143* (2013.01); *B23B 2200/0447* (2013.01); *B23B 2200/081* (2013.01); *B23B 2200/201* (2013.01)
(58) Field of Classification Search
CPC . Y10T 407/235; Y10T 407/23; Y10T 407/24; Y10T 407/245; B23B 27/143;
(Continued)

(56) References Cited

U.S. PATENT DOCUMENTS 3,885,281 A * 5/1975 Stambler ............. B23B 27/1637
407/114
4,359,300 A * 11/1982 Hazra ................... B23B 27/143
407/114
(Continued)

FOREIGN PATENT DOCUMENTS

CA    2788616 A1 * 10/2011   ........... B23B 51/048
JP    05-86405 U    11/1993
(Continued)

OTHER PUBLICATIONS

International Search Report (Form PCT/ISA/210) dated Aug. 26, 2014 and issued for International Patent Application No. PCT/JP2014/064086.

*Primary Examiner* — Sunil K Singh
*Assistant Examiner* — Donte Brown
(74) *Attorney, Agent, or Firm* — Procopio Cory Hargreaves and Savitch LLP

(57) ABSTRACT

A cutting insert of one embodiment is provided with: an insert body having a top surface that has a corner section, a bottom surface, and side surfaces; a cutting edge that is positioned at an intersection between the top surface and the side surfaces, and includes a corner cutting edge, a first cutting edge and a second cutting edge; a rake face that slopes downward away from the cutting edge; and a first raised part that is positioned inside the rake face, and rises upward. The first raised part includes a protruding section that protrudes toward the corner cutting edge. The cutting insert is further provided with a second raised part that extends toward the first cutting edge and the second cutting edge from the protruding section, and has a convex curved shape in which, when viewed from above, the outer peripheral edge on the corner section side.

8 Claims, 11 Drawing Sheets

(58) Field of Classification Search
CPC ............ B23B 27/1607; B23B 27/1618; B23B 2200/20; B23B 2200/201; B23B 2200/08; B23B 27/141; B23B 27/1614; B23B 27/1625; B23B 27/22

See application file for complete search history.

(56) References Cited

U.S. PATENT DOCUMENTS

| | | | | |
|---|---|---|---|---|
| 4,411,565 A * | 10/1983 | Hazra | ................... | B23B 27/143 407/114 |
| 4,561,809 A * | 12/1985 | Porat | ..................... | B23B 27/143 407/114 |
| 5,000,626 A * | 3/1991 | Bernadic | ............... | B23B 27/143 407/114 |
| 5,116,167 A * | 5/1992 | Niebauer | ............... | B23B 27/143 407/114 |
| 8,251,618 B2 * | 8/2012 | Kobayashi | ............ | B23B 27/143 407/114 |
| 8,459,162 B2 * | 6/2013 | Kimura | ............... | B23B 27/1644 407/104 |
| 8,814,480 B2 * | 8/2014 | Cohen | ................... | B23B 27/143 407/113 |
| 9,409,237 B2 * | 8/2016 | Majima | ............... | B23B 27/1607 |
| 2005/0019111 A1 * | 1/2005 | Kitagawa | ............. | B23B 27/141 407/113 |
| 2011/0070040 A1 * | 3/2011 | Park | ..................... | B23B 27/143 407/113 |
| 2011/0229279 A1 * | 9/2011 | Kobayashi | ............ | B23B 27/143 407/115 |
| 2014/0286718 A1 * | 9/2014 | Scherman | ............. | B23B 27/143 407/114 |

FOREIGN PATENT DOCUMENTS

| | | | | |
|---|---|---|---|---|
| JP | 06190612 A | * | 7/1994 | ............ B23B 27/22 |
| JP | 10118810 A | * | 5/1998 | ............ B23B 27/22 |
| JP | 2000-254807 A | | 9/2000 | |
| JP | 2004090198 A | * | 3/2004 | ............ B23B 27/00 |
| JP | 2008-073827 A | | 4/2008 | |
| WO | WO 2007046299 A1 | * | 4/2007 | .......... B23B 27/143 |
| WO | WO 2009001973 A1 | * | 12/2008 | .......... B23B 27/141 |
| WO | WO 2011121787 A1 | * | 10/2011 | .......... B23B 27/141 |
| WO | WO 2015177781 A1 | * | 11/2015 | .......... B23B 27/005 |
| WO | WO 2016017470 A1 | * | 2/2016 | ............ B23B 27/14 |

* cited by examiner

CUTTING INSERT AND CUTTING TOOL, AND METHOD FOR PRODUCING CUT WORKPIECES USING CUTTING TOOL

TECHNICAL FIELD

The present invention relates to a cutting insert and a cutting tool, and a method for producing cut workpieces using the cutting tool.

BACKGROUND ART

A cutting tool for machining a work material made of metal or the like includes a holder and a cutting insert mounted to the holder.

For example, a cutting insert disclosed in Japanese Unexamined Patent Application Publication No. 2008-73827A includes a corner cutting edge that is disposed at an intersection between a top surface and side surfaces and positioned at a corner section between a first side and a second side of the top surface, and a rake face positioned along a cutting edge on the top surface. Furthermore, this cutting insert includes a protruding section near the corner cutting edge of the top surface.

Further, in a direction orthogonal to a bisecting line of the corner section, a width of a tip portion of the corner cutting edge side of this protruding section is small compared to a width of the corner cutting edge.

A protruding section such as described above is disposed near the corner cutting edge, making it possible to make chips, which have been cut by the corner cutting edge when cutting a work material using the corner cutting edge and a first cutting edge, come into contact with the protruding section to change a direction of movement of the chips. As a result, it is possible to facilitate the generation of curled chips.

Nevertheless, according to such a cutting insert as described above, under cutting conditions of a small depth of cut such as when a feed rate is decreased and only the corner cutting edge is used, the following problem arises. That is, the feed rate is decreased, thereby decreasing a thickness of the chips, which potentially leads to an unstable chip discharge direction. Further, the depth of cut is decreased, thereby increasing the likelihood that the chips will come into contact with a tip portion of the protruding section, which is small compared to a width of the corner cutting edge. As a result, the problem arises that the direction of movement of the curled chips is not stabilized, potentially leading to unstable chip generation.

SUMMARY OF INVENTION

A cutting insert according to an embodiment of the present invention includes: an insert body including a polygonal-shaped top surface that includes a corner section, and a first side and a second side each adjacent to the corner section, a polygonal-shaped bottom surface corresponding to the top surface, and side surfaces positioned between the top surface and the bottom surface; a cutting edge positioned at an intersection between the top surface and the side surfaces, the cutting edge including a corner cutting edge positioned at the corner section, a first cutting edge positioned on the first side, and a second cutting edge positioned on the second side; a rake face positioned along the cutting edge on the top surface and sloping downward away from the cutting edge; and a first raised part positioned inside the rake face on the top surface and rising upward. The first raised part includes a protruding section positioned on a bisecting line of the corner section, protruding toward the corner cutting edge, and having a width in a direction orthogonal to the bisecting line of the corner section that decreases toward the corner cutting edge when viewed from above. The cutting insert is further provided with a second raised part positioned on a tip side of the protruding section and extending toward the first cutting edge and the second cutting edge from the protruding section, and having a convex curved shape in which, when viewed from above, an outer peripheral edge on the corner section side forms a protuberance extending toward the corner section side.

DESCRIPTION OF EMBODIMENTS

Cutting Insert

The following describes a cutting insert 1 of one embodiment according to the present invention, with reference to FIGS. 1 to 9B.

Figure 1:
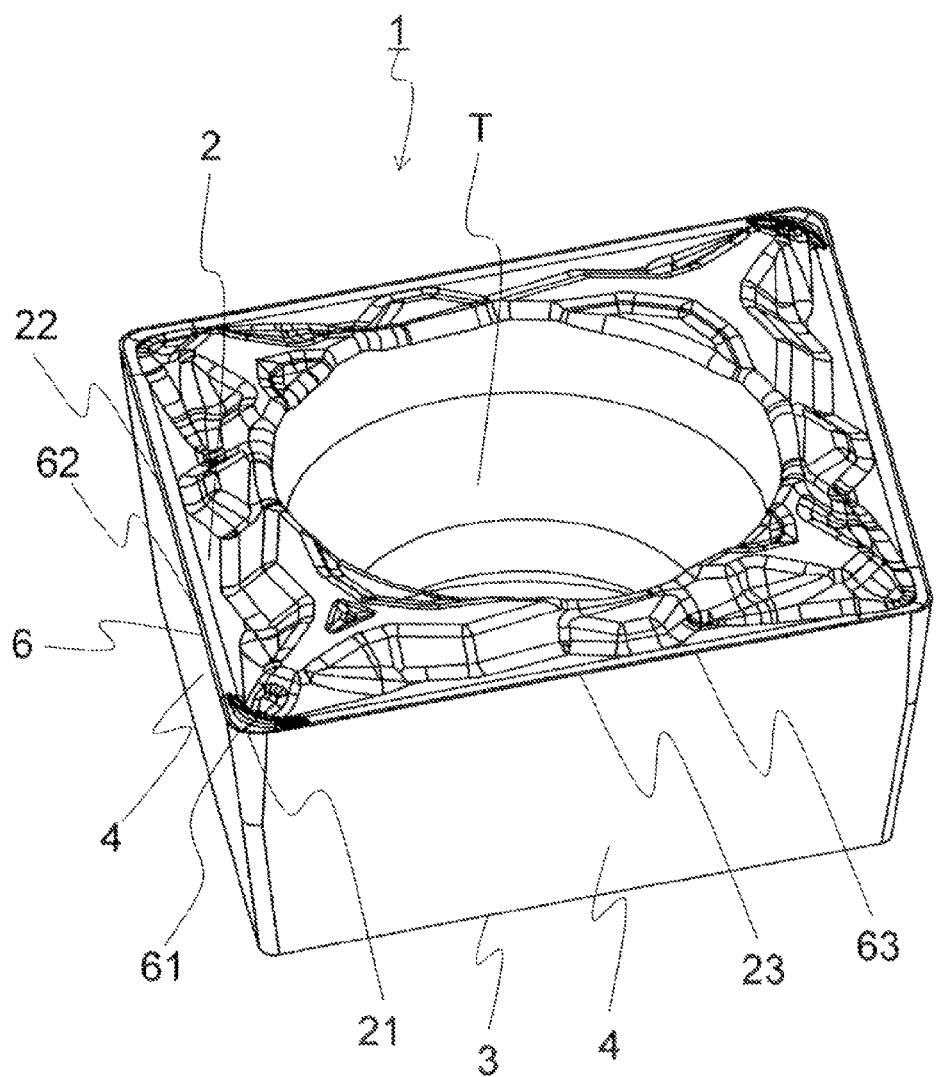
FIG. 1 is a perspective view of a cutting insert according to one embodiment of the present invention.
Figure 2:
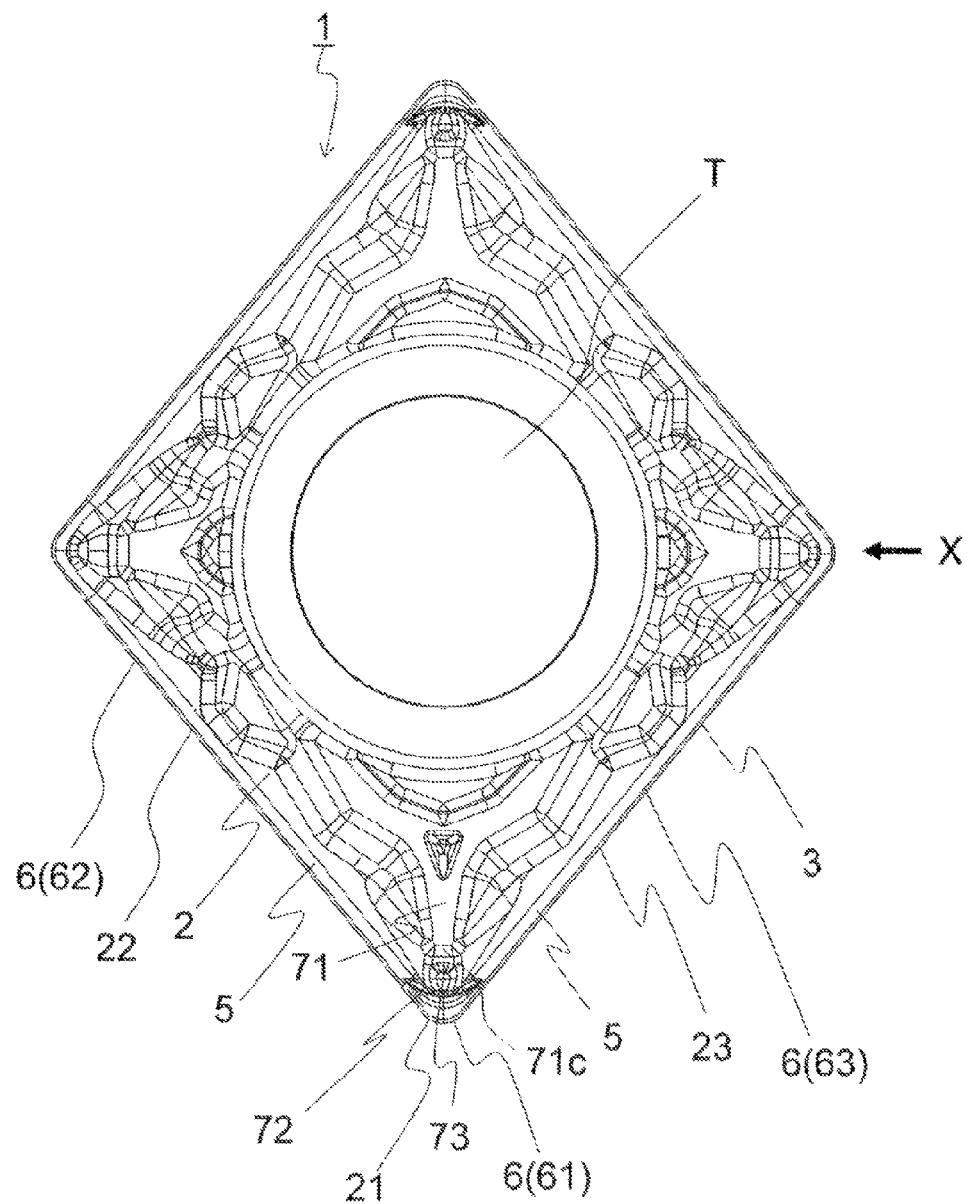
FIG. 2 is a top view of the cutting insert illustrated in FIG. 1.
Figure 3:
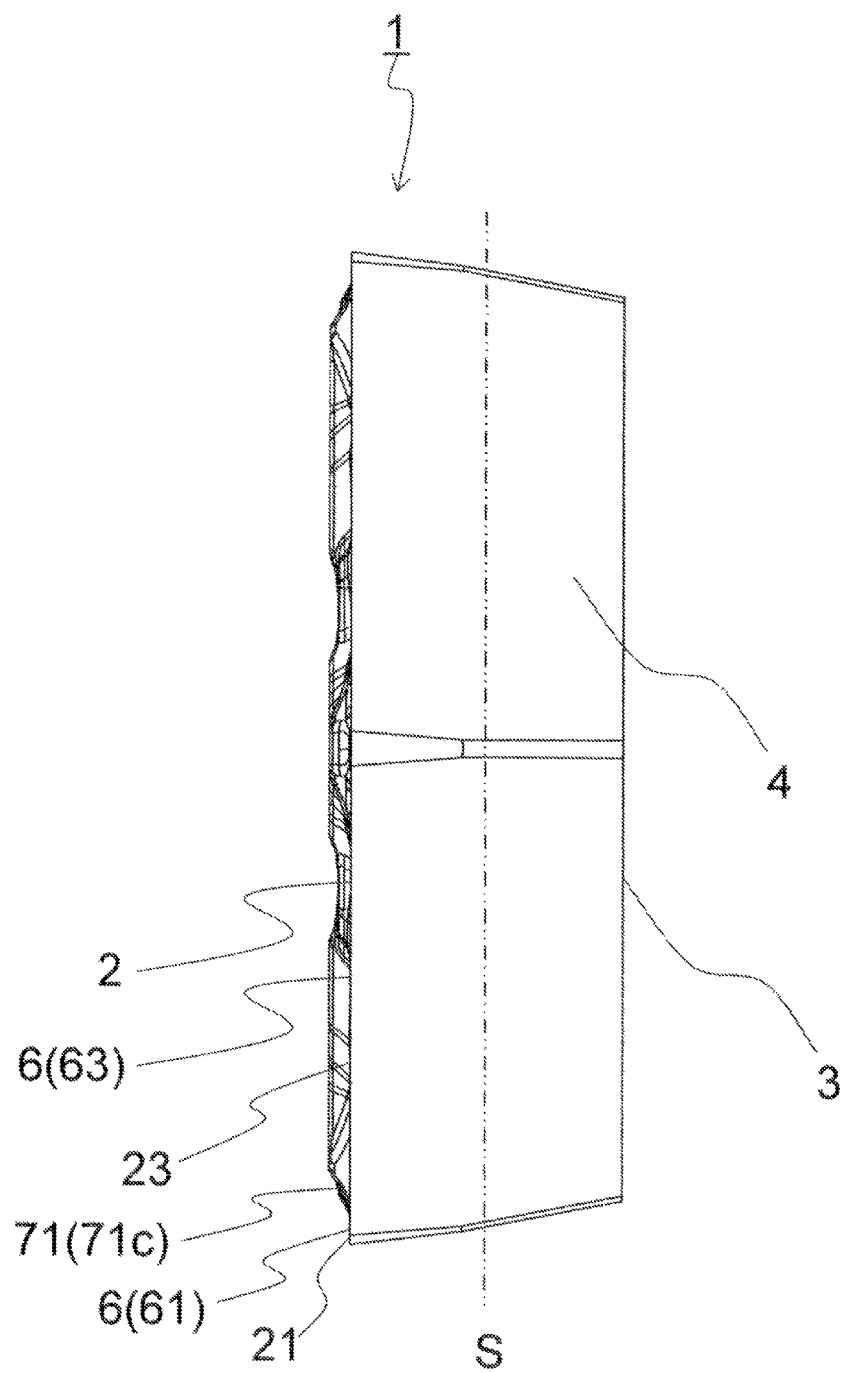
FIG. 3 is a side view of the cutting insert illustrated in FIG. 2, as viewed in the direction X.

An insert body that constitutes the cutting insert 1 includes a top surface 2 having a polygonal shape, a bottom surface 3 having a polygonal shape corresponding to the top surface 2, and side surfaces 4 positioned between the top surface 2 and the bottom surface 3. The top surface 2 has a polygonal shape, and includes a corner section 21, a first side 22 that is adjacent to a first end of this corner section 21, and a second side 23 that is adjacent to a second end of the corner section 21. The cutting insert 1 of the present embodiment, as illustrated in FIG. 2, has a rectangular shape, and more specifically a rhombic shape, as viewed from above.

A width in a longitudinal direction (vertical direction in FIG. 2) of the rhombic-shaped top surface 2 of the cutting insert 1 of the present embodiment is set to approximately 15 to 25 mm, for example. Further, a width in a direction (horizontal direction in FIG. 2) orthogonal to the longitudinal direction is set to approximately 10 to 22 mm, for example. The widths in the longitudinal direction and the direction orthogonal to the longitudinal direction of the rhombic-shaped bottom surface 3 are set in accordance with the size of the top surface 2. A thickness of the cutting insert 1 is set to approximately 3 to 7 mm, for example. The term "thickness" refers to a width in the vertical direction (horizontal direction in FIG. 3) from a section of the top surface 2 that is positioned furthest upward to a section of the bottom surface 3 that is positioned furthest downward, when the cutting insert 1 is viewed from the side.

Examples of the material of the cutting insert 1 include a cemented carbide alloy, cermet, or the like. Examples of the composition of the cemented carbide alloy include WC—Co produced by adding cobalt (Co) powder to tungsten carbide (WC), followed by sintering, WC—TiC—Co produced by adding titanium carbide (TiC) to WC—Co, and WC—TiC—TaC—Co produced by adding tantalum carbide (TaC) to WC—TiC—Co. Cermet is a sintered composite material obtained by compositing metal with a ceramic component, and specific examples thereof include titanium compounds composed mainly of titanium carbide (TiC) or titanium nitride (TiN).

The surface of the cutting insert 1 may be coated with a coating by using chemical vapor deposition (CVD) or physical vapor deposition (PVD). Examples of the composition of the coating includes titanium carbide (TiC), titanium nitride (TiN), titanium carbonitride (TiCN), and alumina ($Al_2O_3$).

Further, a through-hole T that extends from a center of the top surface 2 to a center of the bottom surface 3 is formed in the cutting insert 1 of the present embodiment. The through-hole T is provided to allow insertion of a screw into the through-hole T when the cutting insert 1 is screwed to a holder of a cutting tool. As a method for fixing the cutting insert 1 to the holder, a clamp structure may be employed instead of the foregoing screwing manner.

With the through-hole T formed from the center of the top surface 2 to the center of the bottom surface 3, a central axis of the through-hole T extends in the vertical direction. Hence, in the following, to evaluate a position in the vertical direction of each component of the cutting insert 1 of the present embodiment, a reference plane S orthogonal to the central axis and positioned between the top surface 2 and the bottom surface 3 is defined. In the present embodiment, the reference plane S is positioned parallel to the bottom surface 3.

Figure 4:
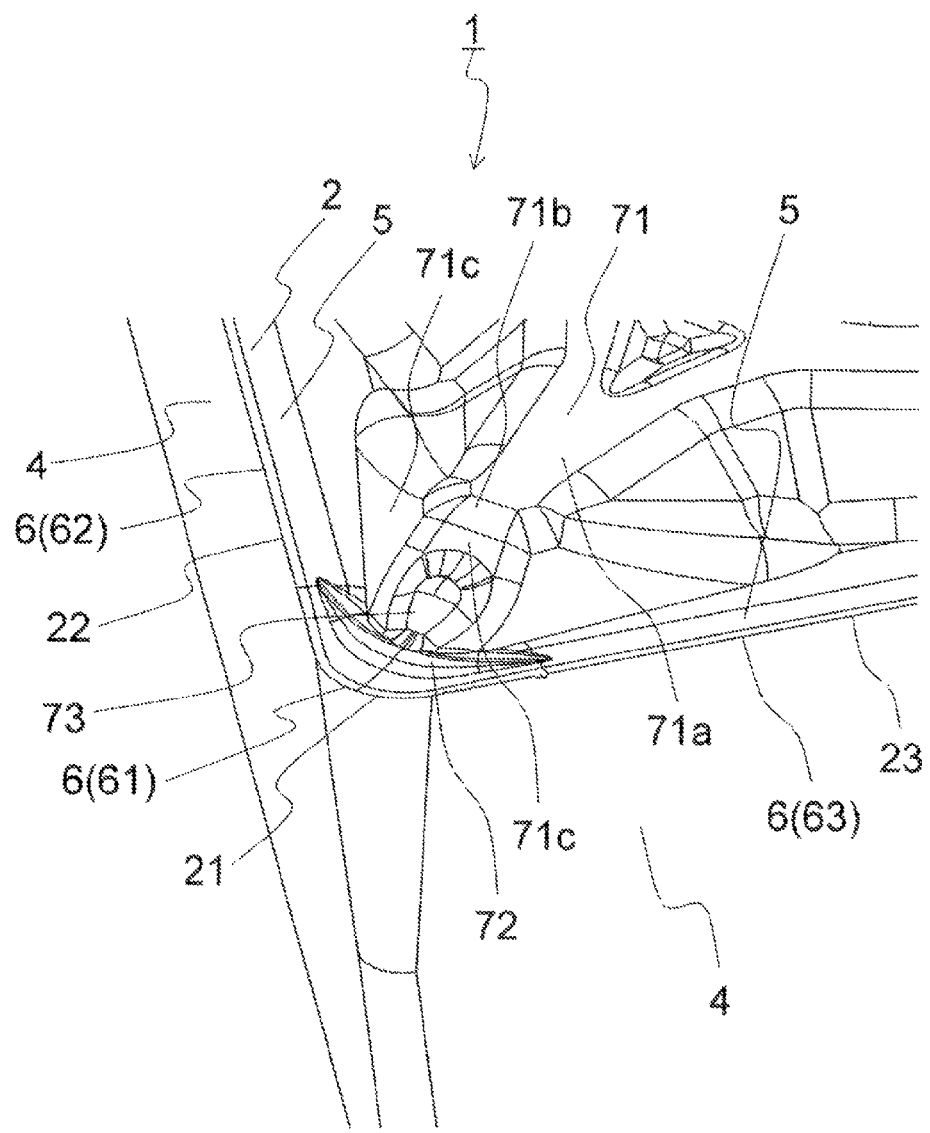
FIG. 4 is a perspective view illustrating a vicinity of a corner section of the cutting insert illustrated in FIG. 1.
Figure 5:
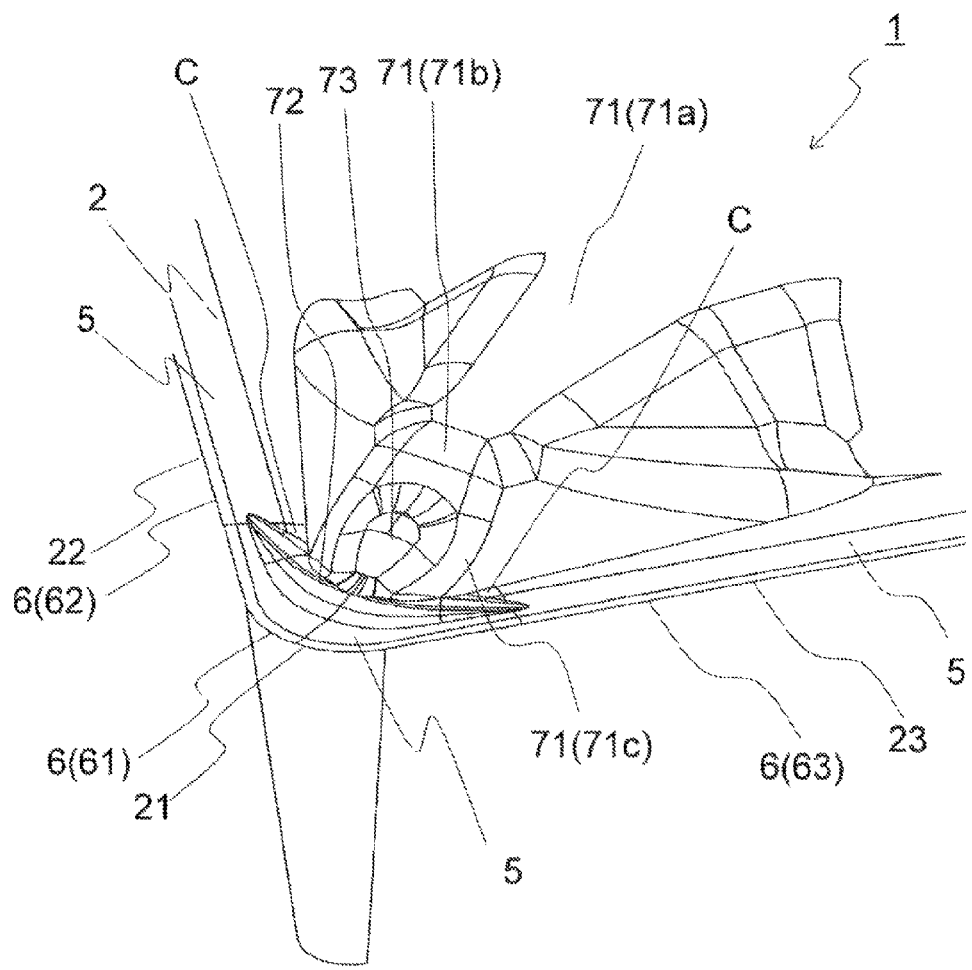
FIG. 5 is an enlarged perspective view of the cutting insert illustrated in FIG. 4.

Further, the cutting insert 1 of the present embodiment, as illustrated in FIG. 4, includes a rake face 5, a cutting edge 6, a first raised part 71, a second raised part 72, and a third raised part 73.

The cutting edge 6 is positioned at an intersection between the top surface 2 and the side surfaces 4, and formed along the first side 22 and the second side 23. The cutting edge 6 includes a corner cutting edge 61 positioned at the corner section 21, a first cutting edge 62 positioned on the first side 22, and a second cutting edge 63 positioned on the second side 23.

It should be noted that the cutting insert 1 of the present embodiment has a so-called single-sided specification in which the cutting edge 6 is formed at the intersection between the top surface 2 and the side surfaces 4. Nevertheless, the cutting insert may have a so-called double-sided specification in which the cutting edge is formed at the intersection between the top surface and the side surfaces, and at the intersection between the bottom surface and the side surfaces.

Further, in the present embodiment, the cutting edge 6 is formed along an entire periphery of the top surface 2. Furthermore, the cutting edge 6 is formed so as to be substantially parallel to the reference plane S.

When the cutting edge 6 is substantially parallel to the reference plane S as in the present embodiment, it is possible to maintain a high strength of the cutting edge 6, thereby making it possible to suppress damage to the cutting edge 6. It should be noted that the cutting edge 6 is not limited to the configuration illustrated in the present embodiment, and may slope so as to come close to the bottom surface 3 as a distance from the corner section 21 increases, for example.

It should be noted that the phrase "slope so as to come close to the bottom surface 3" has the same meaning as "slope downward." On the other hand, the phrase "slope so as to go away from the bottom surface 3" has the same meaning as "slope upward." The same holds true in the following, unless otherwise indicated.

Figure 6:
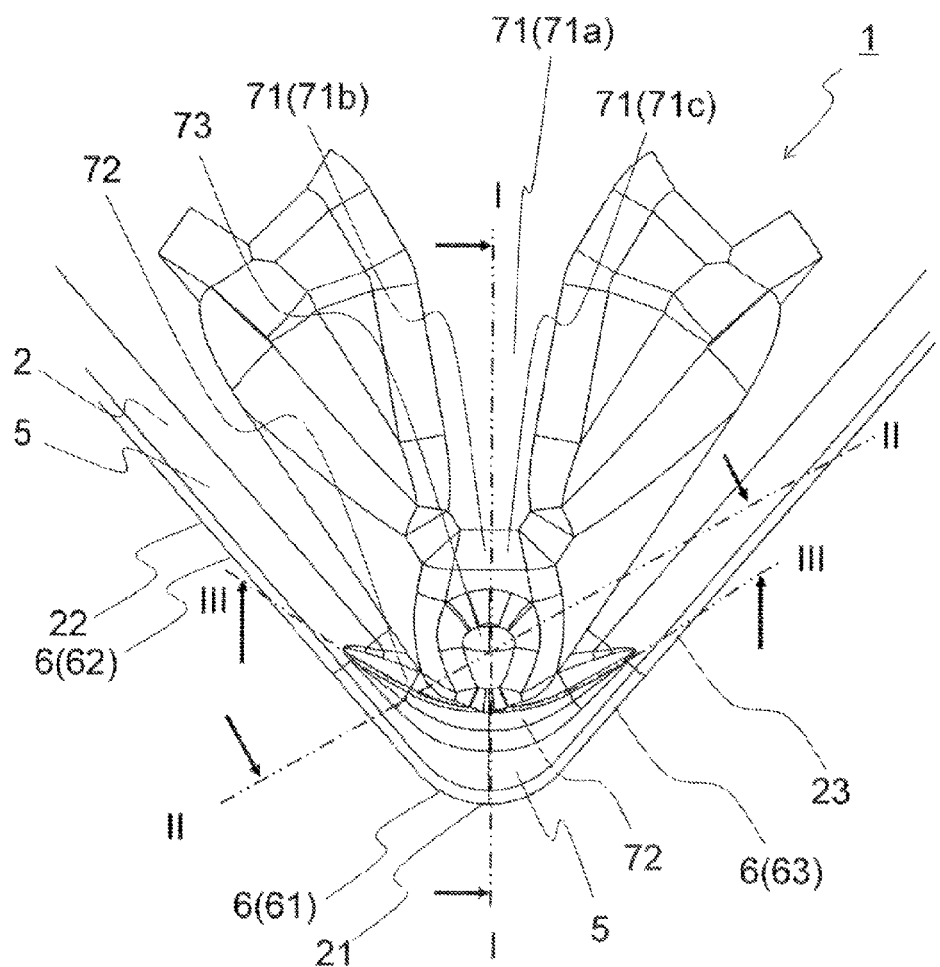
FIG. 6 is an enlarged top view of the vicinity of the corner section of the cutting insert illustrated in FIG. 2.
Figure 8:
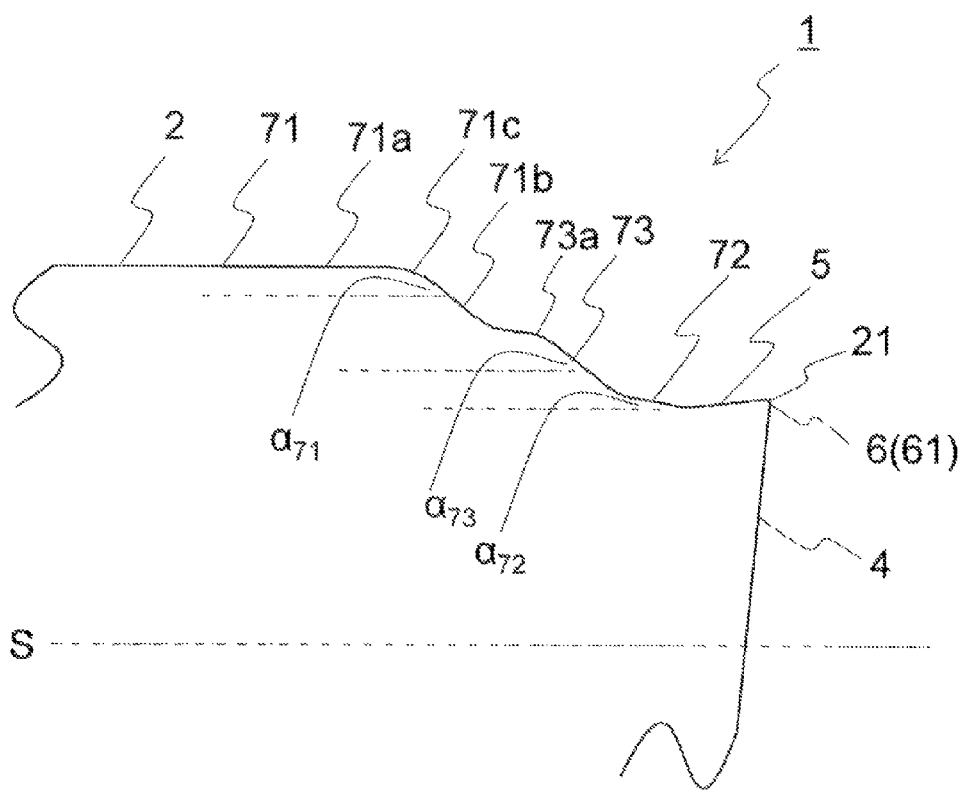
FIG. 8 is a cross-sectional view taken along the line I-I in FIG. 6.

The rake face 5 is positioned along the cutting edge 6 and inside the cutting edge 6 of the top surface 2. In other words, the rake face 5 is positioned along the corner section 21, the first side 22, and the second side 23. Chips of the work material cut by the cutting edge 6 flow on the rake face 5. The rake face 5 slopes downward away from the cutting edge 6. For example, as illustrated in FIG. 8, the rake face 5 of the present embodiment slopes downward from the corner cutting edge 61 toward the inside. It should be noted that while FIG. 8 is a cross-sectional view of the line I-I illustrated in FIG. 6, the line I-I in FIG. 6 is positioned on a bisecting line of the corner section 21.

Further, the rake face 5 of the present embodiment is a curved surface in which an angle of inclination with respect to the reference plane S decreases as the distance from the cutting edge 6 increases. It should be noted that the rake face 5 may be a sloped face in which the angle of inclination with respect to the reference plane S is constant.

The first raised part 71, the second raised part 72, and the third raised part 73 are positioned on the top surface 2.

The first raised part 71 is positioned inside the rake face 5 of the top surface 2, and rises upward. It should be noted that the phrase "rises upward" means that a height from the reference plane S is greater more than a height of a lower end of the rake face 5. Further, the first raised part 71 is positioned further on the inside of the top surface 2 than the rake face 5, but is not separated from the rake face 5 in its entirety. Rather, a portion of the first raised part 71 extends continuously to the rake face 5.

As illustrated in FIG. 8, in a cross section that includes the bisecting line of the corner section 21 and is orthogonal to the reference plane S, the first raised part 71 includes a top surface section 71a that is parallel to the reference plane S, and a tip surface section 71b that is positioned on the corner cutting edge 61 side of the top surface section 71a and slopes downward as the tip surface section 71a comes close to the corner cutting edge 61. It should be noted that, as illustrated in FIG. 8, this tip surface section 71b is a flat sloped surface.

The first raised part 71 of the present embodiment includes a protruding section 71c positioned so as to include the bisecting line of the corner section 21. This protruding section 71c is positioned on the bisecting line of the corner section 21 so as to include the bisecting line of the corner section 21. Further, the protruding section 71c protrudes toward the corner cutting edge 61.

Furthermore, the protruding section 71c decreases in width in a direction orthogonal to the bisecting line of the corner section 21, toward the corner cutting edge 61 when viewed from above. Further, in a cross section that includes the bisecting line of the corner section 21 and is orthogonal to the reference plane S, a height from the reference plane S of the protruding section 71c decreases toward the corner cutting edge 61. That is, in the present embodiment, the protruding section 71c is positioned so as to include a region corresponding to the tip surface section 71b. The protruding section 71c has a tapered shape. The protruding section 71c refers to a region of the first raised part 71 that satisfies the above-described conditions. A portion of the protruding section 71c of the present embodiment extends continuously to the rake face 5.

Figure 7:
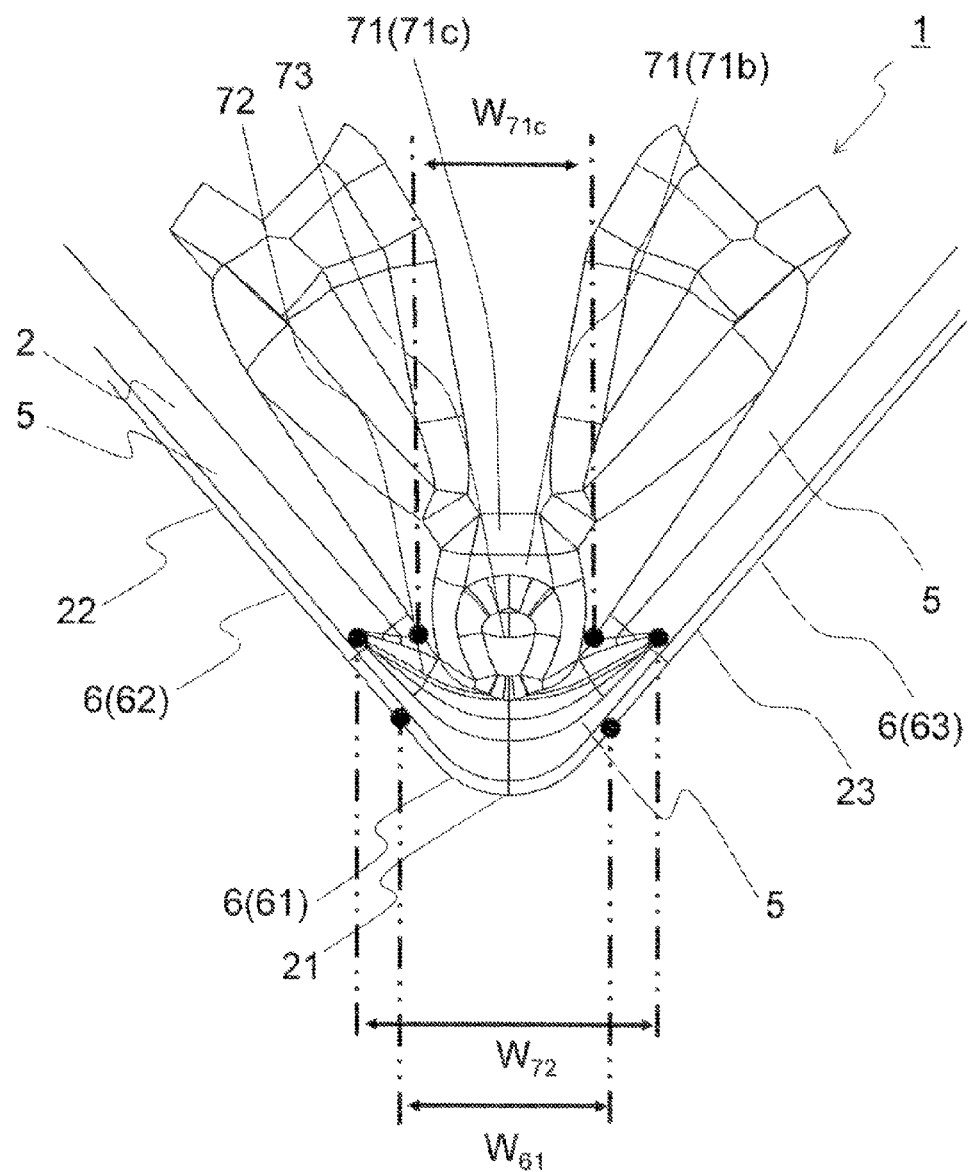
FIG. 7 is a top view illustrating the same region as in FIG. 6.

The second raised part 72 is positioned on the tip side of the protruding section 71c, and extends from the protruding section 71c toward the first cutting edge 62 and the second cutting edge 63. The second raised part 72 is connected to a tip section of the first raised part 71. As a result, a width $W_{72}$ of the second raised part 72 in the direction orthogonal to the bisecting line of the corner section 21 when viewed from above is greater than a width $W_{71c}$ in the direction orthogonal to the above-described bisecting line in a section connected with the second raised part 72 of the protruding section 71c. FIG. 7 illustrates the width $W_{72}$ of the second raised part 72 and the width $W_{71c}$ of the section connected with the second raised part 72 of the protruding section 71c. It should be noted that, in the following, the term "width" refers to the width in the direction orthogonal to the bisecting line of the corner section 21 when viewed from above, unless otherwise indicated.

Figure 9A:
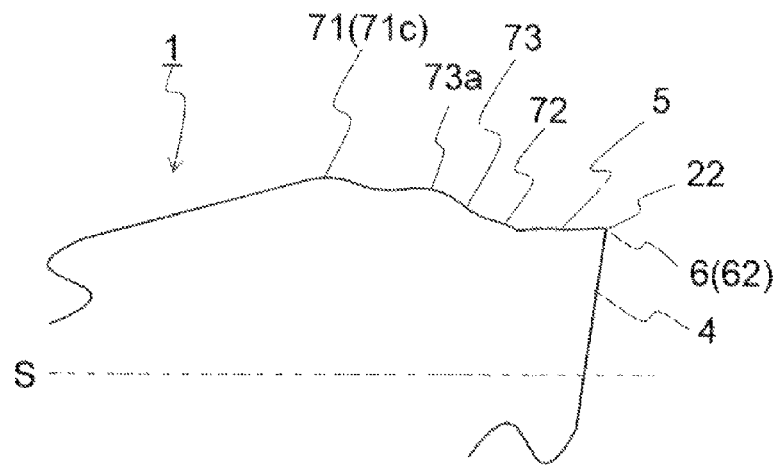
FIG. 9A is a cross-sectional view taken along the line II-II in FIG. 6.
Figure 9B:
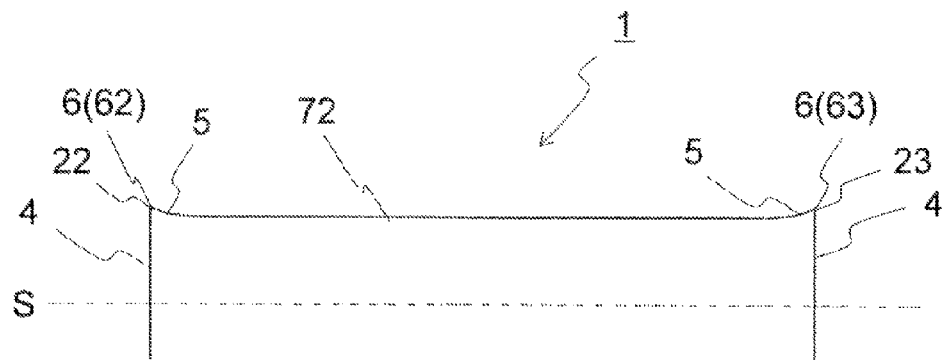
FIG. 9B is a cross-sectional view taken along the line III-III in FIG. 6.

A height from the reference plane S of an upper end of the second raised part 72 in the present embodiment may be less than a height of the top surface section 71a of the first raised part 71. As illustrated in FIG. 9B, in the present embodiment, the upper end of the second raised part 72 is positioned not at one point but along a convex curved line that forms a protuberance extending toward the corner section 21 when viewed from above. That is, on this convex curved line, the height from the reference plane S of the second raised part 72 is constant. FIG. 9B is a cross-sectional view along the line III-III in FIG. 6, and illustrates the height of the upper end of the second raised part 72 from the reference plane S.

In the present embodiment, the second raised part 72 is positioned on the rake face 5. That is, a portion of the protruding section 71c extends so as to be continuous with the rake face 5, and therefore the second raised part 72 is formed on the rake face 5. With the second raised part 72 positioned on the rake face 5, the chips that have a thin thickness and flow along the rake face 5 can be curled at the second raised part 72 in a stable manner.

Further, an outer peripheral edge of the second raised part 72 on the side of the corner section 21 has a convex curved shape that forms a protuberance extending toward the corner section 21 when viewed from above. While the convex curved shape may be an arcuate shape or an oval shape, in the present embodiment the above-described outer peripheral edge of the second raised part 72 has an arc shape that forms a protuberance extending toward the corner section 21.

At this time, a radius of curvature of the above-described outer peripheral edge of the second raised part 72 is preferably large compared to a radius of curvature of the corner cutting edge 61. In the present embodiment, the radius of curvature of the corner cutting edge 61 is, for example, set in a range of from 0.2 mm to 0.8 mm. In contrast, the radius of curvature of the above-described outer peripheral edge of the second raised part 72 is, for example, set in a range of from 0.3 mm to 1.2 mm. It should be noted that the above-described radii of curvature are merely examples and may be suitably changed in accordance with product size, application, and the like.

The third raised part 73 is positioned on the protruding section 71c, and connected to the protruding section 71c. The third raised part 73 is connected to the second raised part 72 as well. An outer peripheral edge of the third raised part 73 of the present embodiment has a substantially circular shape when viewed from above.

The outer peripheral edge on the side of the corner section 21 of the protruding section 73 decreases in width in the direction orthogonal to the bisecting line of the corner section 21, toward the corner cutting edge 61. That is, the third raised part 73 includes a section having a width that decreases in the direction orthogonal to the bisecting line of the corner section 21, toward the corner cutting edge 61. Thus, the third raised part 73 has a shape that tapers as the third raised part 73 comes close to the corner cutting edge 61. Further, a width of the third raised part 73 is small compared to a width of the first raised part 71.

Further, as illustrated in FIG. 8, in a cross section that includes the bisecting line of the corner section 21 and is orthogonal to the reference plane S, the third raised part 73 includes a top surface section 73a having a convex curved shape that slopes downward as the top surface section 73a comes close to the corner cutting edge 61. Further, the tip surface section 71b of the first raised part 71 and the top surface section 73a of the third raised part 73 are smoothly connected by a concave curved line.

The tip of the third raised part 73 is connected to the second raised part 72. Further, as illustrated in FIG. 8, in a cross section that includes the bisecting line of the corner section 21 and is orthogonal to the reference plane S, the third raised part 73 slopes downward as the third raised part 73 comes close to the second raised part 72. The third raised part 73 and the second raised part 72 are smoothly connected by a concave curved line. A height from the reference plane S of an upper end of the top surface section 73a of the third raised part 73 may be less than a height of the top surface section 71a of the first raised part 71 as illustrated in FIG. 8, and greater than the height of the upper end of the second raised part 72 as illustrated in FIG. 9A as well. It should be noted that FIG. 9A is a cross-sectional view along the line II-II in FIG. 6, and illustrates the heights of the first raised part 71, the second raised part 72, and the third raised part 73 from the reference plane S.

In the present embodiment, the second raised part 72 extends from the protruding section 71c toward the first cutting edge 62 and the second cutting edge 63. As a result, in the direction orthogonal to the bisecting line of the corner section 21, both ends of the second raised part 72 are positioned farther away from the bisecting line of the corner section 21 than both ends of the section connected with the second raised part 72 of the protruding section 71c and both ends of the section connected with the second raised part 72 of the third raised part 73.

When cutting the work material, the cutting insert 1 can control a shape and a direction of movement of the chips using the first raised part 71, the second raised part 72, and the third raised part 73. Specifically, the cutting insert 1 of the present embodiment has a chip discharge performance such as the following.

In the cutting insert 1 of the present embodiment, the second raised part 72 extends from the protruding section 71c toward the first cutting edge 62 and the second cutting edge 63. Further, the outer peripheral edge of the second raised part 72 on the side of the corner section 21 has a convex curved shape that forms a protuberance extending toward the corner section 21 when viewed from above. As a result, under cutting conditions of an extremely small depth of cut, such as use of only a portion of the corner cutting edge 61 (a range of no more than one-half of the corner cutting edge 61, for example), it is possible to make the chips come into contact with the second raised part 72 having a relatively wide width $W_{72}$ compared to a tip section of the protruding section 71c in a stable manner. Accordingly, the direction of movement of the chips is stabilized, thereby making it easy to generate chips having a stabilized curled shape.

Furthermore, in the present embodiment, the above-described outer peripheral edge of the second raised part 72 has an arc shape that has a large radius of curvature compared to the radius of curvature of the corner cutting edge 61 and forms a protuberance extending toward the corner edge 61. Accordingly, under cutting conditions of an extremely small depth of cut such as described above, it is possible to facilitate the generation of curled chips in a stable manner, even if a feed rate is increased.

While the above-described radius of curvature of the outer peripheral edge of the second raised part 72 on one side (the right side in FIG. 6) with the bisecting line (line I-I in FIG. 6) of the corner section 21 serving as reference, and the above-described radius of curvature of the outer peripheral edge of the second raised part 72 on the other side (the left side in FIG. 6) are the same in the second raised part 72 of the present embodiment as illustrated in FIG. 6, the present invention is not limited thereto. That is, the above-described radius of curvature of the outer peripheral edge on one side of the bisecting line of the corner section 21 and the above-described radius of curvature on the other side may be different.

In the second raised part 72, as illustrated in FIG. 7, the width $W_{72}$ in the direction orthogonal to the bisecting line of the corner section 21 is greater than a width $W_{61}$ in the direction orthogonal to the above-described bisecting line of the corner cutting edge 61 when viewed from above. As a result, according to the cutting insert 1 of the present embodiment, under cutting conditions of a small depth of cut such as use of a large section of the corner cutting edge 61 (a range of no less than one-half of the corner cutting edge 61 to no more than the entire corner cutting edge 61, for example), the chips come into contact with the above-described second raised part 72 in a stable manner. As a result, the direction of movement of the chips is stabilized by the second raised part 72, thereby making it easy to generate chips in a stabilized curled shape.

Further, when the feeding rate is increased under cutting conditions of a small depth of cut such as described above, it is possible to control a behavior of the chips by the third raised part 73. Specifically, the cutting insert 1 of the present embodiment includes the third raised part 73 that is connected to the second raised part 72 and has a height of the upper end that is greater than the height of the upper end of the second raised part 72. As a result, it is possible to make the chips come into contact with the third raised part 73 even if the chips have traveled over the second raised part 72, thereby making it possible to facilitate the generation of curled chips by the third raised part 73. At this time, because the thickness of the chips increases by increasing the feed rate, the behavior of the chips is stabilized. As a result, while the width of the third raised part 73 in the direction orthogonal to the above-described bisecting line of the corner cutting edge 61 is less than the width of the second raised part 72, it is possible to facilitate the generation of curled chips at the third raised part 73.

In particular, the third raised part 73 and the second raised part 72 are smoothly connected by the concave curved line, making it possible to stabilize and control the behavior of the chips that have traveled over the second raised part 72 at the third raised part 73.

Further, when the feeding rate is further increased under cutting conditions of a small depth of cut such as described above, it is possible to control the behavior of the chips by the protruding section 71c. Specifically, the cutting insert 1 of the present embodiment includes the protruding section 71c that is connected to the second raised part 72 and has a height of the upper end that is greater than the heights of the upper ends of the second raised part 72 and the third raised part 73. As a result, even if the chips have traveled over not only the second raised part 72 but also the third raised part 73 in a case where the feed rate is even higher, it is possible to make the chips cut by the cutting edge 6 come into contact with the protruding section 71c.

More specifically, even if chips having a large thickness have traveled over not only the second raised part 72 but also the third raised part 73, it is possible to make the chips come into contact with the tip surface section 71b, which is a flat sloped surface, of the first raised part 71 in which the protruding section 71c is positioned, thereby making it possible to change the direction of movement of the chips by the flat sloped surface and facilitate the generation of curled chips.

At this time, the third raised part 73 includes the section having a width that decreases in the direction orthogonal to the bisecting line of the corner section 21, toward the corner cutting edge 61. In a case where the feed rate is even higher, the chips come into strong contact with the third raised part 73, making the chips less likely to curl at the third raised part 73.

Nevertheless, with the above-described width of the third raised part 73 decreasing toward the corner cutting edge 61, the chips travel more readily over the third raised part 73 in a case where the feed rate is even higher. Accordingly, the chips more readily face the protruding section 71c, making it possible to generate curled chips at the protruding section 71c in a stable manner.

Further, under cutting conditions of a large depth of cut such as use of the corner cutting edge 61 and a portion of the first cutting edge 62 (second cutting edge 63), the cutting insert 1 has a chip discharge performance such as the following.

When the feed rate is low under cutting conditions of a large depth of cut such as described above, the thickness of the chips is relatively small, but the direction of movement of the chips can be stabilized by the above-described second raised part 72, making it easy to generate chips in a stabilized curled shape.

On the other hand, when the feed rate is increased under cutting conditions of a small depth of cut such as described above, it is possible to control the chips by the protruding section 71c.

As described above, according to the cutting insert 1 of the present embodiment, it is possible to favorably control the behavior of the chips under cutting conditions of a low feed rate and small depth of cut, and it is possible to exhibit excellent chip discharge performance under a whole range of cutting conditions by using the first raised part 71, the second raised part 72, and the third raised part 73.

The lower end of the rake face 5, which has a height from the reference plane S that is less than those of the upper end of both end portions of the second raised part 72 and the upper end of the first raised part 71, is positioned between both end portions of the second raised part 72 and the first raised part 71. As a result, a recess portion C that slopes downward from the second raised part 72 toward the first raised part 71 and then upward again is provided between both end portions of the second raised part 72 and the first raised part 71. With the recess portion C thus formed, the chips that travel over the second raised part 72, pass above the recess portion C, and advance toward the first raised part 71 are curled in the recess portion C, thereby making it easy to facilitate the generation of curled chips.

Further, as illustrated in FIG. 8, according to the cutting insert 1, when an angle of inclination of the first raised part 71, an angle of inclination of the second raised part 72, and an angle of inclination of the third raised part 73 with respect to the reference plane S in a cross section that includes the bisecting line of the corner section 21 and is orthogonal to the reference plane S are represented by $\alpha_{71}$, $\alpha_{72}$, and $\alpha_{73}$ respectively, the angle of inclination $\alpha_{71}$ of the first raised part 71 is greater than the angle of inclination $\alpha_{72}$ of the second raised part 72 and the angle of inclination $\alpha_{73}$ of the third raised part 73. With the angle of inclination $\alpha_{71}$ of the first raised part 71 positioned on the inside of the top surface 2 being greater than those of the second raised part 72 and the third raised part 73 in the cross section illustrated in FIG. 8, it is possible to change the direction of movement of the chips by the first raised part 71 having a large angle $\alpha_{71}$, even if the chips travel over the second raised part 72 and the third raised part 73 and pass the third raised part 73, thereby making it easy to generate curled chips.

It should be noted that, in the present embodiment, the angle of inclination $\alpha_{73}$ of the third raised part 73 is greater than the angle of inclination $\alpha_{72}$ of the second raised part 72.

Further, while the second raised part 72 of the cutting insert 1 of the present embodiment includes the upper end that is positioned along the convex curved line that forms a protuberance extending toward the corner section 21 and has a constant height from the reference plane S as illustrated in FIG. 9B, the shape of the second raised part 2 is not limited thereto. For example, the height from the reference plane S of both end portions in the direction orthogonal to the bisecting line of the corner section 21 may be greater than the height from the reference plane S in a middle portion.

For example, when the height from the reference plane S in the middle portion of the second raised part 72 is greater than the height from the reference plane S of both end portions of the second raised part 72, the chips cannot smoothly travel over the second raised part 72 under cutting conditions such as when the feed rate is further increased, resulting in the possibility of increased susceptibility to additional load on the cutting insert 1.

In contrast, with the height from the reference plane S of both end portions of the second raised part 72 being greater than the height from the reference plane S in the middle portion of the second raised part 72, the chips readily travel over the second raised part 72 under cutting conditions such as when the feed rate is further increased, making it possible to reduce the addition of excessive load on the cutting insert 1. Additionally, when the feed rate is further increased under cutting conditions of an extremely small depth of cut such as described above, it becomes easy to control the direction of movement of the chips.

It should be noted that, while the shape of the top surface 2 of the cutting insert 1 of the present embodiment when viewed from above is the rhombic, rectangular shape as illustrated in FIG. 2, the shape is not limited to such a form. For example, the shape of the top surface 2 when viewed from above may be the shape of a polygon, such as a triangle, a pentagon, a hexagon, or an octagon.

Further, the phrase "the shape when viewed from above is rectangular" does not require the shape to be rectangular in a strict sense, allowing a configuration in which the main parts of the outer periphery of the top surface 2 are formed by four sides and, for example, the corner section 21 has a partially curved shape, for example.

Cutting Tool

Next, a cutting tool 101 of one embodiment according to the present invention will be described with reference to FIG. 10.

Figure 10:
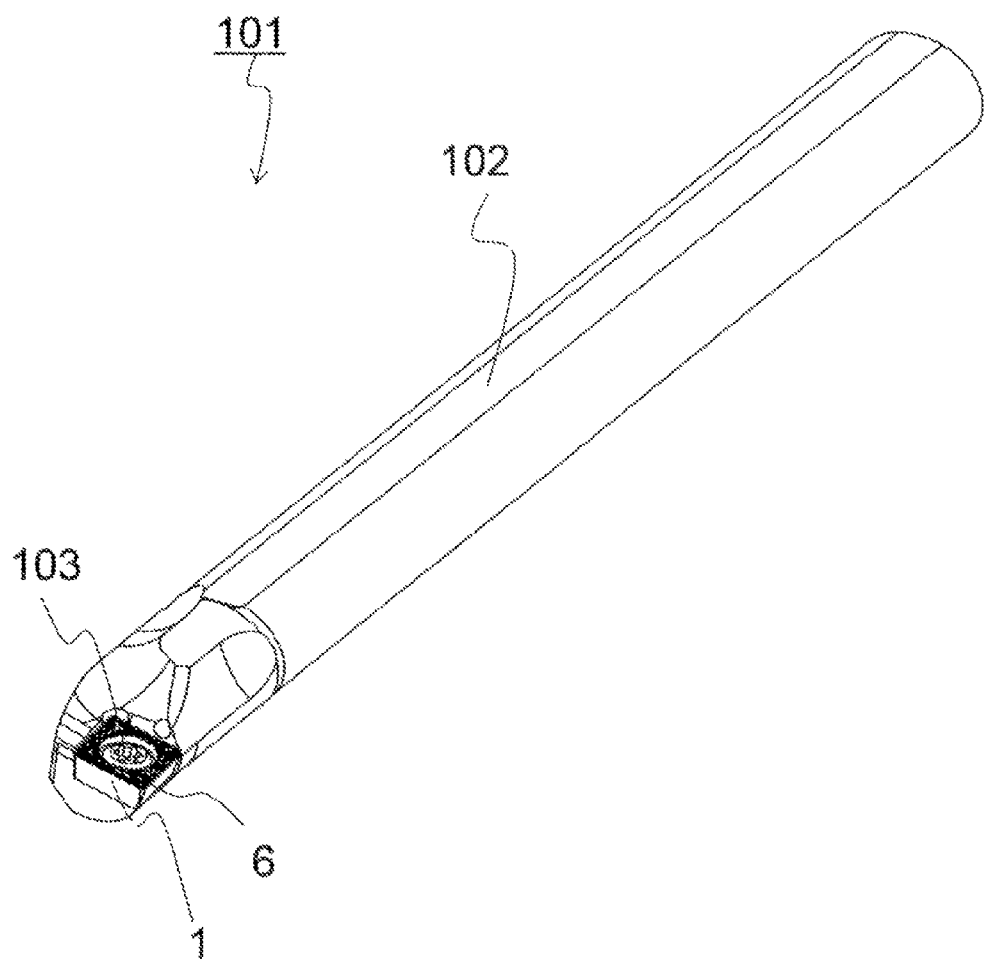
FIG. 10 is a perspective view of a cutting tool according to one embodiment of the present invention.

The cutting tool 101 of the present embodiment is provided with the cutting insert 1 represented by the above-described embodiment, and a holder 102 onto which the cutting insert 1 is mounted, as illustrated in FIG. 10. The holder 102 of the present embodiment includes an insert pocket that has a rod shape and is for mounting the cutting insert 1 on one end portion. The cutting insert 1 is mounted so that the cutting edge 6 protrudes outside an outer periphery of the holder 102.

In the present embodiment, the cutting insert 1 is fixed to the insert pocket by a screw 103. That is, the screw 103 is inserted into a through-hole of the cutting insert 1 and a tip of this screw 103 is inserted into a screw hole (not illustrated) formed in the insert pocket to threadably engage the screw parts together, thereby mounting the cutting insert 1 onto the holder 102.

Examples of materials used for the holder 102 include steel, cast iron, and the like. In particular, steel which has high toughness is preferably used among such materials.

Method for Producing a Cut Workpiece

Next, a method for producing a cut workpiece by cutting a work material 201 of one embodiment of the present invention will be described with reference to FIGS. 11A to 11D.

Figure 11A:
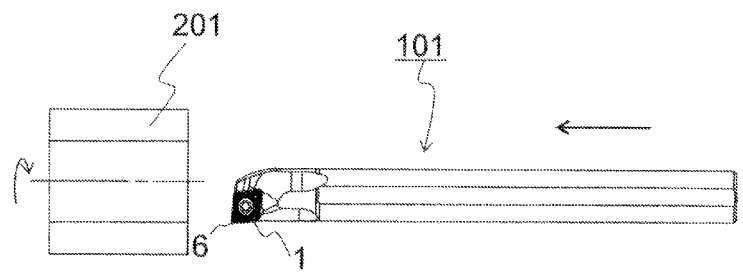
FIGS. 11A to 11D are process drawings illustrating a method for producing a cut workpiece of one embodiment of the present invention.
Figure 11B:
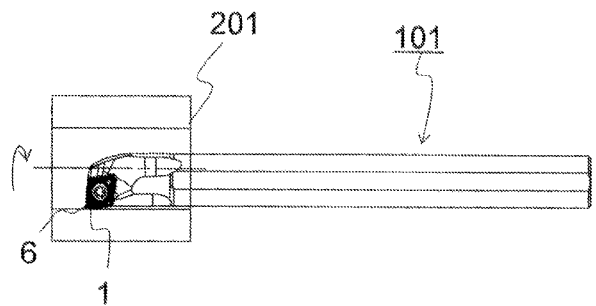
Figure 11C:
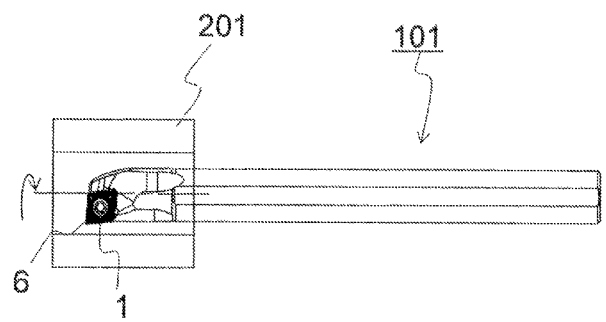
Figure 11D:
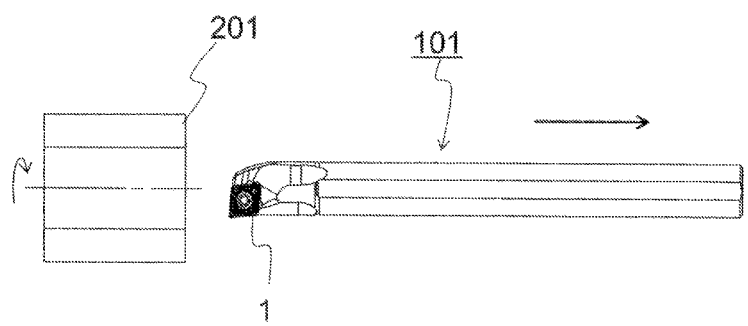

The production method of the present embodiment includes the following steps. That is, the production method includes the steps of:

bringing the cutting tool 101 represented in the above-described embodiment relatively close to the work material 201 with the work material 201 rotating, as illustrated in FIG. 11A;

making the cutting edge 6 of the cutting tool 101 come into contact with the rotating work material 201, as illustrated in FIG. 11B;

separating the cutting edge 6 of the cutting insert 1 of the cutting tool 101 from the work material 201, as illustrated in FIG. 11C; and separating the cutting tool 101 from the work material 201, as illustrated in FIG. 11D.

The method for producing a cut workpiece of the present embodiment is a so-called inner diameter machining based method for producing a cut workpiece in which the work material 201 has a cylindrical shape, and the cutting tool 101 is inserted inside the work material 201 having this cylindrical shape and an inner surface of the work material 201 is cut by the cutting tool 101. It should be noted that the method for producing a cut workpiece is not limited to a method based on inner diameter machining, and may be a so-called outer diameter machining based method for producing a cut workpiece in which an outer surface of the work material 201 is machined.

In the method for producing a cut workpiece of the present embodiment, the cutting insert 1 includes the first raised part, the second raised part, and the third raised part that have the above-described distinctive configuration, and therefore is capable of supporting cut processing of extensive feed rates.

It should be noted that while the work material 201 is rotated with the rotational axis fixed and the cutting tool 101 is brought close to the work material 201 in FIG. 11, the present invention is naturally not limited to such a form.

For example, the work material 201 may be brought close to the cutting tool 101 in the step in FIG. 11A. Similarly, the work material 201 may be moved away from the cutting tool 101 in the step in FIG. 11C. When cut processing is continued, the work material 201 is preferably kept in a rotating state, and a process in which the cutting edge 6 of the cutting insert 1 is made to come into contact with different locations of the work material 201 is preferably repeated. When the used cutting edge 6 wears down, the cutting insert 1 is preferably rotated 180° with respect to the central axis of the through-hole, or inverted upside down to use the unused cutting edge 6.

Typical examples of the material of the work material 201 include carbon steel, alloy steel, stainless steel, cast iron, non-ferrous metal, and the like.

The embodiments according to the present invention are described above. However, the present invention is not limited to the aforementioned embodiments, and naturally includes various modifications within a scope that does not deviate from the spirit of the present invention.

REFERENCE SIGNS LIST

1 Cutting insert
2 Top surface
21 Corner section
22 First side
23 Second side
3 Bottom surface
4 Side surface
5 Rake face
6 Cutting edge
61 Corner cutting edge
62 First cutting edge
63 Second cutting edge
71 First raised part
71a Top surface section
71b Tip surface section
71c Protruding section
72 Second raised part
73 Third raised part
73a Top surface section
101 Cutting tool
102 Holder
201 Work material
C Recess portion
T Through-hole
S Reference plane

The invention claimed is:

1. A cutting insert comprising:
an insert body comprising
a polygonal-shaped top surface including a corner section, and a first side and a second side each adjacent to the corner section,
a polygonal-shaped bottom surface corresponding to the top surface, and
side surfaces positioned between the top surface and the bottom surface;
a cutting edge positioned at an intersection between the top surface and the side surfaces, the cutting edge comprising
a corner cutting edge positioned at the corner section,
a first cutting edge positioned on the first side, and
a second cutting edge positioned on the second side;
a rake face positioned along the cutting edge on the top surface, the rake face sloping downward away from the cutting edge; and
a first raised part positioned inside the rake face on the top surface and rising upward; wherein
the first raised part comprises a protruding section positioned so as to include a bisecting line of the corner section, protruding toward the corner cutting edge, and having a width in a direction orthogonal to the bisecting line that decreases toward the corner cutting edge when viewed from above; and
the cutting insert further comprises a second raised part positioned on a tip side of the protruding section,
the second raised part comprises
a first end located in a side of the first cutting edge; and
a second end located in a side of the second cutting edge,
the second raised part extends toward the first end and the second end from the protruding section,
the second raised part comprises a convex curved shape in which, when viewed from above, an outer peripheral edge on the corner section side forms a protuberance extending toward the corner section,
the first end, when compared to other locations of the second raised part adjacent to the first cutting edge, is both furthest away from the corner section and closest to the first cutting edge, and
the second end, when compared to other locations of the second raised part adjacent to the second cutting edge, is both furthest away from the corner section and closest to the second cutting edge,
wherein, when a reference plane is provided so as to intersect a central axis that connects a center of the top surface and a center of the bottom surface and to be positioned downward from the top surface,
the second raised part has a height from the reference plane of the first end and the second end that is greater than a height from the reference plane in a middle portion positioned on the bisecting line.

2. The cutting insert according to claim 1, wherein a width in a direction orthogonal to the bisecting line of the second raised part is greater than a width in a direction orthogonal to the bisecting line of the corner cutting edge when viewed from above.

3. The cutting insert according to claim 1, wherein the outer peripheral edge of the second raised part and the corner cutting edge have arc shapes, and a radius of curvature of the outer peripheral edge is greater than a radius of curvature of the corner cutting edge.

4. The cutting insert according to claim 1, wherein the second raised part is positioned on the rake face.

5. The cutting insert according to claim 1, further comprises a third raised part positioned on the protruding section and connected to the second raised part, the third raised part comprises a section having a width in a direction orthogonal to the bisecting line that decreases toward the corner cutting edge.

6. The cutting insert according to claim 1, wherein a recess portion is formed between the first end and the second end of the second raised part and the first raised part.

7. A cutting tool comprising:
a holder including an insert pocket on a tip side; and
the cutting insert described in claim 1 mounted in the insert pocket so that the cutting edge protrudes from a tip of the holder.

8. A method for producing a cut workpiece, the method comprising the steps of:
rotating a work material;

making the cutting edge of the cutting tool described in claim 7 come into contact with the rotating work material; and separating the cutting tool from the rotating work material.

\* \* \* \* \*